United States Patent

[11] 3,624,003

| [72] | Inventors | Robert Mark Conde |
| | | Tonawanda, N.Y.; |
| | | Wilfred Drost, Mobile, Ala. |
| [21] | Appl. No. | 844,612 |
| [22] | Filed | July 24, 1969 |
| [45] | Patented | Nov. 30, 1971 |
| [73] | Assignee | Union Carbide Corporation |
| | | New York, N.Y. |

[54] ZEOLITIC DESICCANT BODIES AND PROCESS FOR PREPARING SAME
8 Claims, No Drawings

| [52] | U.S. Cl. | 252/455 Z |
| [51] | Int. Cl. | B01j 11/40 |
| [50] | Field of Search | 252/455 Z, 463; 55/75 |

[56] References Cited
UNITED STATES PATENTS

| 2,865,867 | 12/1958 | Van Dyke et al. | 252/455 Z |
| 3,234,147 | 2/1966 | Drost et al. | 252/455 Z |
| 3,251,783 | 5/1966 | Keith et al. | 252/463 |
| 3,255,027 | 6/1966 | Talsma | 252/463 UX |
| 3,268,295 | 8/1966 | Armbrust, Jr. et al. | 252/463 X |
| 3,301,788 | 1/1967 | Cummings et al. | 252/455 X |

*Primary Examiner*—Daniel E. Wyman
*Assistant Examiner*—C. F. Dees
*Attorneys*—Paul A. Rose, Thomas I. O'Brien, John C. Le Fever and Richard G. Miller ABSTRACT: Adsorbent bodies suitable for use in drying refrigerants comprise an agglomerate core of zeolitic molecular sieve crystals having thereon over substantially its entire outer surface a hardened permeable coating of a thermally deactivated boehmite alumina, said coating being hardened by having impregnated therein cured potassium silicate.

ZEOLITIC DESICCANT BODIES AND PROCESS FOR PREPARING SAME

The present invention relates in general to composite desiccant materials. More particularly, the invention relates to hardened agglomerates of crystalline zeolitic molecular sieves and to the process for preparing same.

Crystalline zeolitic molecular sieves occur naturally or are synthesized as fine crystalline bodies which for general utility in commercial adsorptive or catalytic processes are usually formed into agglomerates, preferably possessing as high a degree of attrition resistance and crush strength as possible without unduly affecting the adsorptive properties of the sieve. One method of agglomerating these finely crystalline materials is by combining them with a clay binder as described in U.S. Pat. No. 2,973,327 issued Feb. 28, 1961 in the name of W. J. Mitchell et al. Whereas this prior technique provides a suitable agglomerate for a wide variety of industrial applications, it has been found that certain applications having a very low tolerance for attrition-produced particles or dust require a more strongly bound molecular sieve agglomerate.

In addition, it has been found that under some conditions, halogenated derivatives of ethane and methane employed as refrigerant gases are decomposed to some extent by a number of prior known molecular sieve agglomerates used as desiccants in the system.

It is, therefore, the general object of this invention to provide a molecular sieve agglomerate having improved resistance toward attrition and dusting, and a novel process for preparing same.

It is a further and more particular object to provide a molecular sieve agglomerate for use as a desiccant in refrigerant systems containing halogenated hydrocarbons whereby decomposition thereof is negligible and the sieve does not undergo significant mechanical breakdown or loss of crystallinity.

In accordance with the present invention, improved, attrition resistant desiccant bodies are prepared by the process which comprises applying to the outer surface of a crystalline zeolitic molecular sieve agglomerate an essentially continuous coating of a finely divided inert alumina monohydrate which has been thermally treated at temperatures of from about 250° to 350° C. to reduce the surface activity thereof, contacting and impregnating at least the coating of the agglomerate thus formed with an aqueous solution of potassium silicate, drying the potassium silicate impregnated agglomerate to remove a substantial portion of water therein, and thereafter firing the resulting composite agglomerate to set and harden the silicate and activate the molecular sieve.

The structure of crystalline zeolites may be described as an open three-dimensional framework of $SiO_4$ and $AlO_4$ tetrahedra. The tetrahedra are cross-linked by the sharing of oxygen atoms, so that the ratio of oxygen atoms to the total of the aluminum and silicon atoms is equal to two, or $O/(Al+Si)=2$. The negative electrovalence of tetrahedra containing aluminum is balanced by the inclusion within the crystal of cations, for example alkali metal and alkaline earth metal ions such as sodium, potassium, calcium and magnesium ions. One cation may be exchanged for another by ion-exchange techniques.

These zeolites may be activated to develop characteristic zeolite molecular sieve properties by driving off substantially all of the water of hydration. The space remaining in the crystals after activation is available for adsorption of adsorbate molecules having a size, shape and energy which permits entry of the adsorbate molecules into the pores of the molecular sieves.

Any type of crystalline zeolite molecular sieve may be employed in the present method to provide a hardened zeolitic molecular sieve agglomerate according to the invention. The selection of the particular sieve will depend on factors such as the apparent pore size of the material, and the end use of the agglomerate For example, the pores must be at least large enough to receive the desired adsorbate molecule. In the case of refrigerant drying, the pores are preferably less than about 4.9 Angstroms in diameter so as to permit the inclusion of the water molecules and exclude the larger halogenated hydrocarbon molecules. This latter aspect is discussed more fully hereinafter in relation to removal of moisture from halogenated methane and/or ethane-containing refrigerants.

Among the naturally occurring crystalline zeolitic molecular sieves are erionite, chabazite, analcite, faujasite, clinoptilolite and mordenite. The natural materials are adequately described in the chemical art. Synthetic zeolitic molecular sieves include zeolite A (U.S. Pat. No. 2,882,243); zeolite T (U.S. Pat. No. 2,950,952); zeolite X (U.S. Pat. No. 2,882,244); zeolite E (U.S. Pat. No. 2,962,355); zeolite F (U.S. Pat. No. 2,996,358); zeolite M (U.S. Pat. No. 2,995,423); zeolite Y (U.S. Pat. No. 3,130,007); zeolite Z (U.S. Pat. No. 2,972,516,); zeolite Q (U.S. Pat. No. 2,991,151); zeolite S (U.S. Pat. No. 3,054,657); and zeolite R (U.S. Pat. 3,030,181).

It is especially preferred that for use in drying halohydrocarbon refrigerants the agglomerates of this invention contain as the zeolitic molecular sieve the species now generally known as zeolite 3A. Zeolite 3A can be prepared from the sodium cation form of zeolite A by replacing at least 65 equivalent percent of the sodium cations with potassium cations by conventional cation exchange techniques. The preparation and characterization of sodium zeolite A is disclosed in detail in U.S. Pat. No. 2,882,243. The potassium cation exchanged zeolite A, i.e., zeolite 3A, will adsorb molecules having critical diameters up to 3 Angstrom units.

The initial or starting agglomerate of molecular sieve crystals can comprise essentially only the sieve crystals pressed or otherwise compacted so that the agglomerate possesses sufficient handling strength. On the other hand, mixtures or blends of molecular sieve with binder materials such as clay, silicates or both clay and silicates can be employed. Thus, prior art agglomerates such as those disclosed in U.S. Pat. No. 2,973,327, Mitchell et al. can readily be employed in the present process since the novel composite agglomerate produced in such cases possesses improved strength properties without adverse effect upon adsorption properties. It is in fact preferred that the initial or starting molecular sieve agglomerate be one formed by the blending of clay with molecular sieve crystals.

In preparing such a clay containing starting agglomerate, the clay should be semiplastic or plastic in the presence of water at atmospheric temperatures and capable of acquiring a substantial "green" strength upon exposure for short periods of time to the drying process of the air. Examples of clays which may be employed for bonding molecular sieves without substantially altering the adsorptive properties of the molecular sieve are attapulgite, kaolin, sepiolite, palygorskite, kaolinite, plastic ball clays, clays of the attapulgite or kaolin types, bentonite, montmorillonite, illite, chlorite and bentonite-type clay. Preferably, the clay is one such as attapulgite having a pH (measured in aqueous dispersion) of not more than 8.5 and more preferably not more than 8. Some commercially available clays, because of acid treatment during preparation for the market, have pH values of as low as about 5.5. The slightly acid character of these clays has been found to be somewhat beneficial to the present process.

The amount of clay with respect to molecular sieve in the preferred starting agglomerate depends primarily upon the degree of dilution of the molecular sieve permissible in a desired use of the final product. For most purposes, a clay content of from 5 percent to 35 percent by weight of the final product is satisfactory.

Having provided an initial molecular sieve agglomerate, the essential second step of the present process is accomplished by applying to the surface of the said agglomerate a relatively thin coating of a finely divided alumina monohydrate which has been thermally treated to reduce its surface activity toward potassium silicate. The thermal treatment of the alumina comprises heating at a temperature within the range of 250° C. to 350° C., preferably with a dry inert gas stream purge such as air, nitrogen and the like or in vacuum for from about 0.75 to 1.5 hours.

The alumina monohydrate materials which have been found satisfactory in the method of this invention are those having the boehmite (böhmite) crystal lattice. Although sometimes referred to as "gamma-alumina," crystalline boehmite is "alpha-alumina monohydrate," according to the American system of nomenclature for alumina hydrates. The characteristic X-ray diffraction pattern for boehmite is shown in ASTM diffraction data card 5–0190. Boehmite is to be distinguished from other oxides of aluminum such as the minerals hydrargillite or gibbsite ("alpha-alumina trihydrate"), bayerite ("beta-alumina trihydrate"), the mineral diaspore ("beta-alumina monohydrate") and high-temperature phases such as corundum ("alpha-alumina"). Transformation from the alpha-monohydrate to the gamma, delta, and theta transition forms, and finally to alpha-alumina (above about 1,100° C.), is observed as boehmite is heated at progressively higher temperatures.

One commercial, readily dispersible boehmite alumina has a particle size such that 75 percent of the particles are less than 44 microns, with an ultimate crystallite size of 0.01 micron; a typical composition is 88 percent alumina monohydrate, 10 percent free moisture, 1 percent carbon and the balance $SiO_2$, $Fe_2O_3$, $Na_2O$ and S. Another suitable boehmite material is a fibrous boehmite which is in the form of fibrils having one or more dimensions in the colloidal range; a material of this type is disclosed in U.S. Pat. NO. 2,915,475, issued Dec. 1, 1959. Boehmite aluminas are in general characterized by relatively high surface area and high surface reactivity. Additional reactivity and dispersibility may be imparted to these materials by treatment with surface-modifying agents such as acetates and stearates during their preparative process.

The average particle size of the alumina is not narrowly critical. It has been found that particles having a mesh size of less than about 300 mesh and preferably less than about 350 mesh (U.S. Standard Sieve) give optimum results. Larger particles can be suitably employed provided the method of contacting the coating material with the starting molecular sieve agglomerate involves sufficient mechanical force to further reduce the particle size of the coating material. Since, as discussed hereinafter, the heat treatment appears to be essential by virtue of its effect on the surface of the alumina, the heat treatment should be carried out after comminution of the alumina has been accomplished.

Several types of solids-solids blending apparatus are useful in the method of the invention for applying the treated alumina coating to the agglomerate as well as for subsequent hardening or working of the coated body as, for example, by tumbling. Tumbling of the agglomerates in admixture with the coating particles in an apparatus having a "cement-mixer" type of rotational action has been found to be quite suitable. Other obvious means can of course be employed. For large-scale operation, for example, a coating pan can be advantageously employed. This equipment is commonly used by the pharmaceutical industry to coat tablets and in the food and confectionery industry for producing certain types of candy and chewing gum. The spherical agglomerates are rolled in the pan and the coating powder is periodically admitted. The motion of the agglomerates rubbing against each other helps to distribute the powder particles evenly over their surface. The pan or drum may be of a regular cylindrical shape or smoothly contoured. Usually, the pan is held and rotated at the end of a shaft inclined at an angle of about 60° from the horizontal. The interior surfaces of the pan may be smooth or have ribs or flights thereon. Hardening of the spheres by tumbling after the coating step may be done in this pan or in a separate rotating drum.

It has been found that very thin coatings of alumina monohydrate are adequate, thus causing a minimum of dilution of the molecular sieve content of the final product. Coatings of at least about 1 micron thickness are usually required, with about 0.00025 inch coating thicknesses being preferred. Coatings having thicknesses above about 0.003 inch do not in general contribute any more to the improvement in attrition-resistance than those less than 0.003 inch but if desired, can be employed. With very thick coatings, i.e., those about 0.03 inch or greater, some undesirable chipping of the final product due to differences in expansion properties of the central molecular sieve agglomerate and the outer coating may be observed.

After the alumina coating has been applied, the resulting coated agglomerates are thereafter contacted or soaked in an aqueous solution of potassium silicate. The potassium metal silicate solution can suitably vary in its ratio of potassium oxide to silicon dioxide throughout the entire range of dispersibility. The presence of colloidal silica in suspension in the impregnating solution is not detrimental but has not been found to materially improve the product. Solutions containing alkali metal oxide to silicon dioxide ratios of 0.477 to 0.40 have been used with excellent results. Ratios lower than about 0.35 may be used but are not preferred because they tend to have increasing amounts of the silicon dioxide present in undissolved form.

The solid content of the silicate solution which is the sum of weight percent of the alkali metal oxide and the silicon dioxide in the solution may be from about 2 to about 4 weight percent. Lower than about 2 percent will not provide a sufficient introduction of silicate into the agglomerate to materially improve the crush strength, while more than about 4 percent leads to loss of adsorption capacity of the contained molecular sieve.

Within the above ranges of ratio of oxides and solid contents of the solution, the quantity of solution employed to impregnate a quantity of coated molecular sieve agglomerate may be in the range to provide from about 0.03 to about 0.07 pounds of solution solid per pound of agglomerate.

The contact or soaking of the agglomerates in the silicate solution may be either batch-type or continuous. When batchwise contact is employed, it is desirable to provide agitation for uniformity. Such agitation may be conducted by stirring the solution with moderation, to avoid breaking up the agglomerates.

Continuous contact is conveniently accomplished by percolating the solution through a chamber containing the agglomerates. In the continuous-contact method the concentration of the solids in the silicate solution may be in the lower concentration range and the solution can be replenished as the solids are depleted.

The immersion may be hot or cold, the advantage of heat being that shorter contact time may be employed but the disadvantage is the increased tendency toward alkali attack on the crystal structure of the zeolitic molecular sieve. Temperatures below about 60° C. are to be preferred to reduce this attack, particularly when the alkali metal oxide to silicon dioxide ratio is high.

The amount of silicate impregnated into the agglomerates is affected by all of the variables in the instant method and the time of contact. In some instances when using concentrated treating solutions, elevated temperatures, and very porous agglomerates, an immersion time of a few minutes is satisfactory. Longer contact times will generally result in an increase in the quantity of silicate entering the agglomerate and the distance of penetration of the silicate into the agglomerate. The time may extend to several hours or even several days, if desired, provided that the integrity of the agglomerate or the molecular sieve crystal is not affected. Increase in either or both the concentration and distance of the penetration will increase the final crush resistance of the product.

It is readily seen that by employing short immersion times in the practice of this invention, one can make a product having a hardened, abrasion-resistant exterior on the agglomerates which is entirely satisfactory for applications where this property is desired. On the other hand, longer contact times will effect a somewhat deeper hardening, which is preferred for maximum crushing resistance.

Following the immersion step, the agglomerates are separated from the treating solution and may, if desired, be given a brief water rinse which will remove just enough of the solution adhering to the outer surface of the agglomerates to eliminate the tendency of the agglomerates to adhere to each other.

After the agglomerates have been separated from the impregnation solution they may be fired. However it is preferred to give them an intermediate drying to reduce their moisture content to the range of 15 to 22 weight percent. This drying may for example be done by air-blowing and can be aided by moderate heating in the temperature range of 180° to 350° F. This drying serves to substantially remove the inter crystalline water, thus reducing the heating load and steaming in the firing step.

The firing step completes the setting of the binder and at the same time removes the intracrystalline water of the crystalline molecular sieve, thereby activating it for adsorbent use. The firing may be done for example in a ventilated or forced-flow purge kiln to sweep out the evolved water vapor. The firing temperature required to set the binder and to activate the molecular sieve is in general within the range of about 1,050° F. to 1,220° F. By activation is meant driving off substantially all of the water of hydration of the molecular sieve crystals leaving the internal pores of the sieve free to accept adsorbate molecules.

Although we do not wish to be bound by any particular theory, it appears that the superior properties of the agglomerates of this invention are attributable to a significant degree to the heat treatment of the boehmite alumina coating prior to contact with the potassium silicate solution. Microscopic examination of agglomerates prepared in identical fashion as those of this invention, except for the alumina heat treatment, showed a hardened outer zone and numerous radial cracks. This condition was considered to be the result of tresses caused by limited penetration of the potassium silicate into the alumina coating. The use of heat treated alumina permits the potassium silicate impregnating solution to penetrate well into the mass of the agglomerate. The "case-hardened" zone is less sharply defined and hence no extreme stresses are set up between the center and outer zone. For reasons about which no theories have yet been advanced, the results obtained by premixing the alumina powder with the potassium silicate prior to application to the agglomerate core are not nearly as advantageous as those obtained from the practice of the present invention.

In assessing the exceptional physical properties of the agglomerates of this invention, a number of test procedures were employed. They are as follows:

I. Wet Attrition

A. Frigidaire Wet-Attrition Test. This test measures both the wet attrition and the impact strength of the bodies. In accordance with the procedure, 100 ml. of desiccant beads are placed in a cylindrical 118–ml. glass container having dimensions 5.25 cm. in diameter and 6.35 cm. in height and provided with a tight-fitting closure. Trichloroethylene (50 ml.) is added to the desiccant beads and the closed container is subjected to a vertical reciprocating motion having an amplitude of 4.44 cm. and a frequency of 330 cycles per minute for 22.5 hours. The fines produced by attrition are thereafter washed from the beads with the trichloroethylene through a No. 100 U.S. Standard Sieve into a beaker, isolated from the trichloroethylene, heated to 350° C. to activate the sieve, and weighed. The weight obtained, expressed as a weight percent of the initial charge of desiccant beads is taken as the measure of the wet attrition strength.

B. Paint Shaker Wet-Attrition Test. This test measures principally attrition wet strength. In accordance with the procedure, 136 ml. of desiccant beads are placed in a cylindrical 150–ml. container having a diameter of 4.4 cm. and a height of 10 cm. 68 ml. of trichloroethylene are added, the container closed, and subjected to a high frequency swirling motion in a Model No. 30 Red Devil Paint Conditioner (manufactured by Red Devil Tools, Union, N.J.) for 30 minutes. The fines produced by attrition are measured as described hereinbefore in the Frigidaire wet-attrition test.

II. Crushing Strength Test

This test consists of placing a single agglomerate on a flat metal plate on a spring scale and increasing the loading force on a plate arranged to rest on top of the agglomerate until it is crushed. The crushing strength value (pounds) is an average for at least 25 activated agglomerates.

III. Degassing

The degassing problem is one encountered by the commercial user who installs a quantity of the molecular sieve agglomerates in each refrigerant system. Degassing is simply the result of the adsorption of air by the activated sieve agglomerates before they are made a part of the sealed total refrigeration system. Such adsorbed gas shows up when, as a leak-testing procedure, the system is pumped down to a specified pressure and held thereat for a fixed length of time. The resultant desorption of the air from the agglomerates causes a pressure reading that might be construed as indicative of a leak (or a degassing from some other source) in the unit under test. Another problem may be the evolution of air which is adsorbed during normal refrigerator operation and then replaced by the water being slowly adsorbed. This air collects in the system as a noncondensable gas and interferes with the refrigerant flow. The test procedure is as follows:

An empty dryer tube, approximately 12 inches long and three-eights inch in diameter, is attached to a vacuum pump and pumped on for 8 minutes. The pressure in the tube is indicated in microns ($\mu$) by means of a Hastings Vacuum Gauge. The tube is then shut off from the pump and the pressure reading is taken again after 10 minutes. An 8.0 g.–sample of beads is then loaded into the tube and the same procedure is followed as above. The difference in these two readings minus the difference from the empty tube reading is the degassing value in microns.

IV. Refrigerant Decomposition

This test is designed to determine the tendency of a zeolite desiccant to chemically decompose chlorodifluoromethane to form noncondensable gases, primarily carbon monoxide. The procedure is as follows:

Approximately 2.5 g. of beads are loaded into a stainless steel bomb, which is approximately 5 inches long by 1½ inches in diameter. The sample is activated by heating while under vacuum. Chlorodifluoromethane is introduced into the bomb by immersing the bomb in liquid $N_2$, and condensing the gaseous R–22. Further vacuum must be drawn to make sure all air is out of the sample. The bomb is immersed in a 60° C. water bath for 3 weeks, checking weekly by means of pressure increase to determine the amount of noncondensables formed by the reaction in the bomb. These measurements are reported as cc.'s of CO formed per gram of sample.

EXAMPLE 1

Spherical agglomerates were initially formed by dry-blending Type 3A molecular sieve crystals (80 parts by weight, anhydrous) and attapulgus clay (20 parts by weight, anhydrous), adding 21 parts by weight water, and forming spherical bodies by tumbling. The moisture content of the bodies was 34 weight percent. With continued tumbling, 2 percent by weight based on the weight of the bodies of a finely divided boehmite alumina (average particle size 44$\mu$), previously heated at 300° C. for 1 hour in air was added to the tumbler apparatus over a 2 minute period. Tumbling was continued for 1.5 hours. At the end of the tumbling period, 1 pint of the alumina coated beads was soaked for 6 hours at 70° F. in 0.5 liters of a solution of potassium silicate having a total solids content of 2.9 percent. The soaked beads were then drained and dried gently in warm air. The dried beads were fired at 625° C. for 30 minutes in a rotary kiln. The wet attrition loss was determined to be 0.8 percent. By the degassing test, a value of 74 was obtained.

B. The procedure of example 1 (A) was repeated with the exception that the boehmite alumina powder employed as the coating material was not calcined prior to application to the zeolite-clay agglomerate core. The crush strength of the final product was found to be an unacceptably low value of 4.0 pounds.

EXAMPLE 2

The procedure of example 1 (A) was repeated with the exception that the alumina powder employed as the coating material was calcined in air at 300° C. for 2 hours prior to application to the zeolite-clay agglomerate core. The crush strength of the final product was found to be an unacceptably low value of 4.0 pounds.

What is claimed is:

1. Process for preparing hardened agglomerates of crystalline zeolitic molecular sieve crystals which comprises forming an initial agglomerate comprising compacted molecular sieve crystals, applying a substantially uniform thin coating of boehmite alumina particles to said initial agglomerate, said alumina particles having been thermally deactivated by heating at temperatures of from about 250° C. to 350° C. for from about 0.75 to about 1.5 hours, impregnating the alumina-coated agglomerated thus obtained with an aqueous potassium silicate solution having a solids content of from about 2 to 4 weight percent, and thereafter firing the potassium silicate impregnated agglomerate at a temperature within the range of from about 1050° F. to about 1220° F.

2. Process according to claim 1 wherein the initial agglomerate comprises molecular sieve crystals bonded with clay, said clay comprising from about 5 to about 35 weight percent of the initial agglomerate.

3. Process according to claim 2 wherein the boehmite alumina particles coated on the initial agglomerate have a particle size smaller than 300 mesh, U.S. standard sieve, the potassium silicate solution has a potassium oxide to silicon dioxide ratio of from about 0.477 to about 0.40, and the quantity of potassium silicate solution employed to impregnate the alumina coated agglomerate is from about 0.03 to about 0.07 pounds of solution solid per pound of agglomerate.

4. Process according to claim 3 wherein the coating of alumina particles has a thickness of from about 1 micron to about 0.003 inch.

5. Process according to claim 4 wherein the zeolitic molecular sieve crystals comprise zeolite A.

6. Process according to claim 5 wherein the zeolite A is the potassium exchanged form of zeolite A having uniform pore diameters of about 3 Angstrom.

7. The molecular size agglomerate prepared in accordance with the process of claim 1.

8. The molecular sieve agglomerate prepared in accordance with the process of claim 6.

* * * * *